United States Patent [19]

Gage

[11] Patent Number: 5,349,550
[45] Date of Patent: Sep. 20, 1994

[54] LONG SEQUENCE CORRELATION COPROCESSOR

[75] Inventor: Douglas W. Gage, San Diego, Calif.

[73] Assignee: The United States of America as represented by the Secretary of the Navy, Washington, D.C.

[21] Appl. No.: 722,059

[22] Filed: Jun. 27, 1991

[51] Int. Cl.[5] .......................................... G06F 15/336
[52] U.S. Cl. ................................................ 364/728.03
[58] Field of Search ................................... 364/728.03

[56] References Cited

U.S. PATENT DOCUMENTS

| | | |
|---|---|---|
| 3,836,058 | 1/1975 | Savit . |
| 3,952,299 | 4/1976 | Hodge et al. . |
| 4,285,046 | 8/1981 | Henry . |
| 4,404,645 | 9/1983 | Elings et al. . |
| 4,545,025 | 10/1985 | Hepner et al. . |
| 4,817,014 | 3/1989 | Schnider . |

*Primary Examiner*—David C. Cain
*Attorney, Agent, or Firm*—Harvey Fendelman; Thomas Glenn Keough

[57] ABSTRACT

A long sequence correlation coprocessor LSCC accelerates the bitwise correlation of arbitrarily long digital sequences by calculating in parallel the correlation score for 16, for example, adjacent bit alignments between two binary sequences. The LSCC integrated circuit is incorporated into a computer system with memory storage buffers and a separate general purpose computer processor which serves as its controller. Each of the LSCC's set of sequential counters simultaneously tallies a separate correlation coefficient. During each LSCC clock cycle, counter enable logic associated with each counter compares one bit of a first sequence with one bit of a second sequence to increment the counter if the bits are the same. A shift register assures that the same bit of the first sequence is simultaneously compared to different bits of the second sequence to simultaneously calculate the correlation coefficient by the different counters to represent different alignments of the two sequences. Two sequence input elements, each with a control block, present the sequence bits serially to this shift register and the count enable logic associated with the sequential counters. Two (or some other number of) data receivers accept externally clocked serial data streams, divide them into computer words, and make them available for the external computer processor to transfer to external memory storage buffers. The external computer processor controls the LSCC's correlation process by writing appropriate control parameters to the LSCC's control registers; by writing the length of the sequences to be correlated to the LSCC's length register; by coordinating the flow of the data streams from the LSCC's data receivers to the memory storage buffers; by coordinating the flow of the words of data from the memory storage buffers to the LSCC's sequence input elements as required; and by reading the correlation coefficients from the sequential counters upon completion of each full correlation calculation.

6 Claims, 3 Drawing Sheets

LONG SEQUENCE CORRELATION COPROCESSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of binary data correlation and more specifically to correlation coprocessors. Digital correlation is the process of establishing the degree of similarity between two digital sequences by counting the number of bits which are the same in the two sequences. For example, the 9-bit sequences "010010101" and "011010110" have a correlation coefficient of 6, meaning that they are the same in 6 of the 9-bit positions. The correlation coefficient is dependent on the alignment of the two sequences, so that if the second sequence is rotated right one bit, to become "00101011", the correlation coefficient falls to 4. An incoming stream of data may be correlated with one or more predetermined sequences to determine which of them is embedded in the data stream, and where. Or, a data stream may be compared with itself to detect periodic patterns, and to establish the length of these patterns. Alternatively, two incoming data streams may be compared to each other to determine the degree to which they match, and to determine the optimum synchronization alignment between them.

A number of VLSI correlation integrated circuits have been developed over the past decade. To minimize correlation delay for extremely time-critical applications such as radar, the logic incorporated in these chips calculates a correlation score using a parallel adder, so for each correlation clock cycle, typically 50 ns, the correlator calculates the score for the next alignment of input data and the reference pattern. Therefore the number of input bits to the adder must be as large as the length of the sequences to be correlated. Current correlation integrated circuits can typically handle 64 to 256 bits of data at a time. If longer sequences must be correlated, more hardware is required.

Consider, for example, a data processing application in which a binary data stream is coming in from a radar or some other high data-rate source at 10 Mbps (10 million bits per second). Every time a new bit comes in, the preceding 100 bits of the data stream have to be correlated with a given 100-bit reference pattern. The chip is initially loaded with the reference pattern, and then the data stream is fed in at 10 Mbps. Every 100 ns a new bit is clocked into the chip. The same clock also shifts the last 99 bits inside the chip, and 100 comparators inside the chip each generate a "1" for each bit that matches or a "0" signal for each bit that does not match. Then a large adder array sums the number of "1" signals, and the correlation coefficient appears in binary on 7 parallel output lines (perhaps on the next clock pulse, 100 ns later). So every 100 ns, which is the bit time of the data, one new correlation coefficient is calculated. Thus a 100-bit sliding window of the data is correlated with a predefined bit sequence, in real time. The numbers of this example may be applicable to a radar application, and current chip technology supports this kind of processing speed.

However, there are circumstances where it is necessary to correlate much longer sequences of data which may have been previously captured and stored in computer memory, or which arrives at a much lower data rate. Consider, for example, an acoustic application, in which the data is coming in at 10 kbps (10 thousand bits per second, or 1,000 times slower than the radar example mentioned above) and it is desired to correlate a 10,000-bit pattern (100 times longer than before). If the previous approach is merely expanded, 100 times as many chips will be needed, each running at 1/1000 the speed of which it is capable.

Moreover, while prior art correlation processors calculate the correlation between incoming serial data and a predefined reference sequence, in many correlation applications the reference pattern is not known in advance; repetitions within the incoming data itself have to be analyzed. The approximate length (for example, 10,000 bits) of the repeating pattern is known, but doppler effects can shorten or lengthen it. To correct for this effect, the actual pattern length must be determined, so the last 9,990 bits are correlated with the preceding 9,990; the last 9,991 bits with the preceding 9,991; . . . and the last 10,010 bits with the preceding 10,010. This does not need to be done for every new bit that comes in, just once per pattern block of 10,000 bits; 10,000 scores are not needed for every 10,000 bits, just 20 or so, to track the doppler error. After the doppler correction is determined for a block of data, it is also possible to reprocess the same data in order to identify other repetition patterns in the data.

Thus, there is a need for VLSI correlation processing hardware that can economically address acoustic and other applications requiring the correlation of long sequences of binary data.

SUMMARY OF THE INVENTION

The present invention is directed to providing a long sequence correlation coprocessor (LSCC) 100 for correlating two binary sequences of data. Each of a number of sequential counters 130a–130n tallies a separate correlation coefficient at the same time. Each sequential counter is controlled by counter enable logic 120, which, during each LSCC clock cycle, compares one bit of the first sequence with one bit of the second sequence and the sequential counter is incremented if the bits are the same. A shift register 121 incorporated into the counter enable logic 120 provides that the same bit of one sequence of binary data 156 simultaneously is compared to different bits of the second sequence of binary data 122a–122n to simultaneously calculate the correlation coefficients by the different sequential counters, to represent different alignments of the two sequences of binary data. Two sequence input elements 140 and 150, each with a control block 144 and 154, present the data bits serially to this counter enable logic 120. A computer memory 400 external to the LSCC and hosted on the data bus 200 of an external computer processor 300, holds the sequence of data in storage buffers 410 and 420 until the computer processor transfers them, a computer word at a time, to the LSCC's sequence input elements 140 and 150. Two (or some other number of) data receiver elements 160 and 170 accept externally clocked serial data streams; divide them into computer words and make them available for the external computer processor 300 to transfer to the external storage buffers 410 and 420. Computer processor 300, of a general purpose design, is external to the LSCC and controls the correlation process by setting appropriate control parameters in the LSCC's control register 111, by writing the length of the sequences to be correlated to the LSCC's length register 113, by coordinating the flow of the data streams from the LSCC's data receiver elements 160 and 170 to storage buffers 410 and 420, and by coordinating the flow of the words of data from storage buffers 410 and 420 to the LSCC's sequence input elements 140 and 150 as required. Computer processor 300 reads correlation coefficients from sequential counters 130a–130n upon completion of each full correlation cycle. Operation of this long sequence correlation coprocessor can be further improved by incorporating a direct memory access controller, (not shown as such in the figures) into the LSCC to control feed of the words of data between sequence storage buffers 410 and 420 and sequence input elements 140 and 150. The LSCC affords a more effective or efficient means of calculating the desired correlation coefficient than the fully parallel processor in cases where (1) long data sequences must be correlated, (2) the data to be correlated has been already captured and is present in computer memory, or (3) the individual data bits arrive relatively slowly.

An object of the invention is to provide an effective and efficient means for the correlation of arbitrarily long bit sequences, with no increase in the amount of hardware logic required.

Another object of the invention is to provide a correlation coprocessor using sequential counters with hardware parallelism providing simultaneous calculation of correlation scores for adjacent alignments of two binary data sequences.

Still another object of the invention is to provide a correlation coprocessor having ease of system hardware implementation.

Yet another object of the invention is to provide a correlation coprocessor affording software programmability.

A further object of the invention is to provide a more efficient means of processing the correlation coefficient than the prior art fully parallel processing scheme previously described, especially to address case where (1) long sequences must be correlated, (2) the data to be correlated has been already captured and is present in computer memory, or (3) the individual data bits arrive relatively slowly.

These and other objects of the invention will become more readily apparent from the ensuing specification and drawings when taken in conjunction with the appended claims.

DETAILED DESCRIPTION OF THE PREFERRED EMBODIMENT

Figure 1:
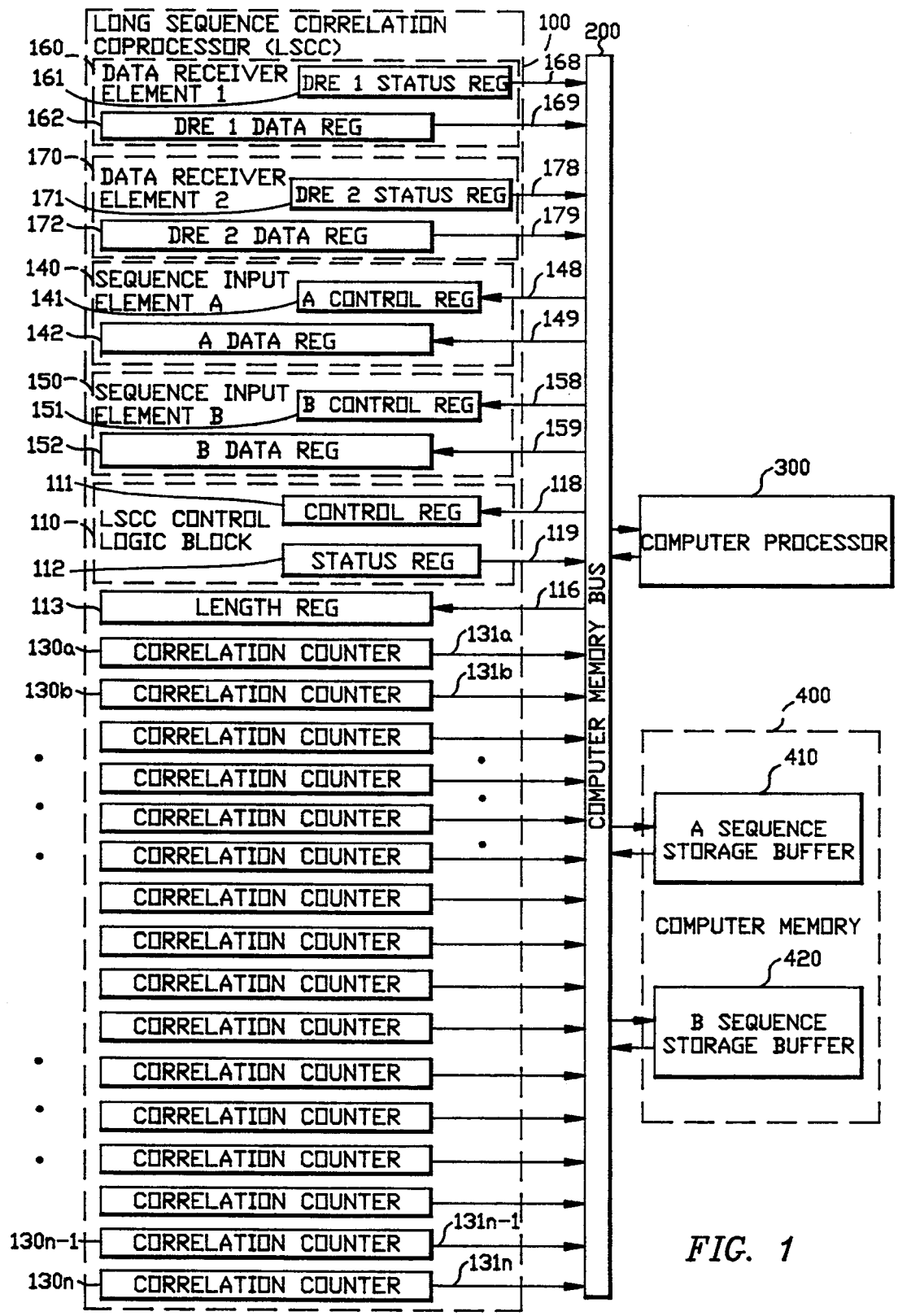
FIG. 1 shows how the LSCC coprocessor is interfaced to a computer memory bus and integrated into a system which also includes a computer processor to control the system and computer memory to provide storage of data. This Figure shows the flow of data to and from the memory mapped registers of the long sequence correlation coprocessor. These registers are interfaced to the memory bus address and data lines of a general purpose computer processor so that words of data can be written to and read from them by the computer processor under the control of its stored program.

Referring to FIG. 1 of the drawings, a long sequence correlation coprocessor (LSCC) 100 fabricated in accordance with this inventive concept is operatively interconnected to a computer processor 300 and an A sequence storage buffer 410 and a B sequence storage buffer 420 held in computer memory 400 via a computer memory bus 200.

The term computer processor is intended to define the part of a conventional microcomputer or microprocessor, for example, which is usually fabricated on a separate chip which controls, by appropriate programming thereof, the functioning of interconnected logic elements for the responsive processing of binary data. Suitable computer processors are well known and one skilled in the art to which this invention pertains routinely would select an appropriate unit for the processing application described herein and would have the selected computer processor routinely programmed in accordance with well established programming procedures to accomplish the processing called for in this inventive concept.

The approach utilized by this invention is to implement specialized correlation logic functions on a dedicated integrated circuit chip, which can be operated at speeds which may be much higher than the incoming bitstream data rate. In order to do this, a mechanism is needed to feed the binary sequence data to sequence input elements 140 and 150 of LSCC 100 as fast as it can be processed by the LSCC, and storage buffers 410 and 420 are needed to temporarily store the input data sequence and output data via 131a–131n.

A separate computer processor chip 300 therefore is used as a controller for the LSCC 100 to keep track of the large amounts of data and to feed the right data to the right place at the right time, and data storage 400 is provided by separate memory chips for an A sequence storage buffer 410 and a B sequence storage buffer 420. The use of computer processor 300 also provides great flexibility, since it allows the high level logic controlling the correlation process to be implemented as easily modified software. The LSCC integrated circuit incorporates an interface to the address and data lines of computer processor memory bus 200, so that computer processor 300 can read data words from the memory mapped registers of the LSCC and write data words to them, just as if the LSCC were another memory chip and accordingly is designated a coprocessor for correlating long sequences of binary data.

Computer processor 300, executing instructions in hundreds or even thousands of nanoseconds, controls the operating modes of LSCC 100 by writing parameters 118, 148 and 158 to the LSCC's control registers 111, 141 and 151, writes data a word at a time to the LSCC's sequence input elements registers 140 and 150 and when the calculation is complete, reads the appropriate LSCC's correlation registers 130a–130n to get the final answers. These memory bus data transfers happen as fast as computer processor 300 can handle them (about 1 per microsecond). Internal to the LSCC, a separate control clock, not shown, drives the LSCC's functional logic as fast as it can go (about 100 nanoseconds cycle time).

The correlation logic of the LSCC 100 is IDLE until it is activated when the computer coprocessor 300 loads a non-zero value into the LSCC length register 113 and it is HALTed until computer processor 300 writes a RUN or STEP command to the LSCC's control register 111. Computer processor 300 reads the A and B sequence data out of the memory storage buffers 410 and 420, and feeds it into the LSCC's sequence input element data registers 142 and 152 in accordance with the computer processor's program. Sequence input elements 140,150 indicate when they are ready to accept another word of data by setting a certain bit in the LSCC's status register 112, which the computer processor reads via the memory bus 200. Since the beginning or end of a data sequence to be correlated may fall in the middle of a computer word, the computer processor instructs the LSCC's sequence input element 140, 150 to discard a number of initial or final bits of a data word by writing a control word 148, 158 to the sequence input element's control register 141, 151 before writing the data word 149, 159 to the data register 142, 152. No control word is written when no bits are to be discarded.

Figure 2:
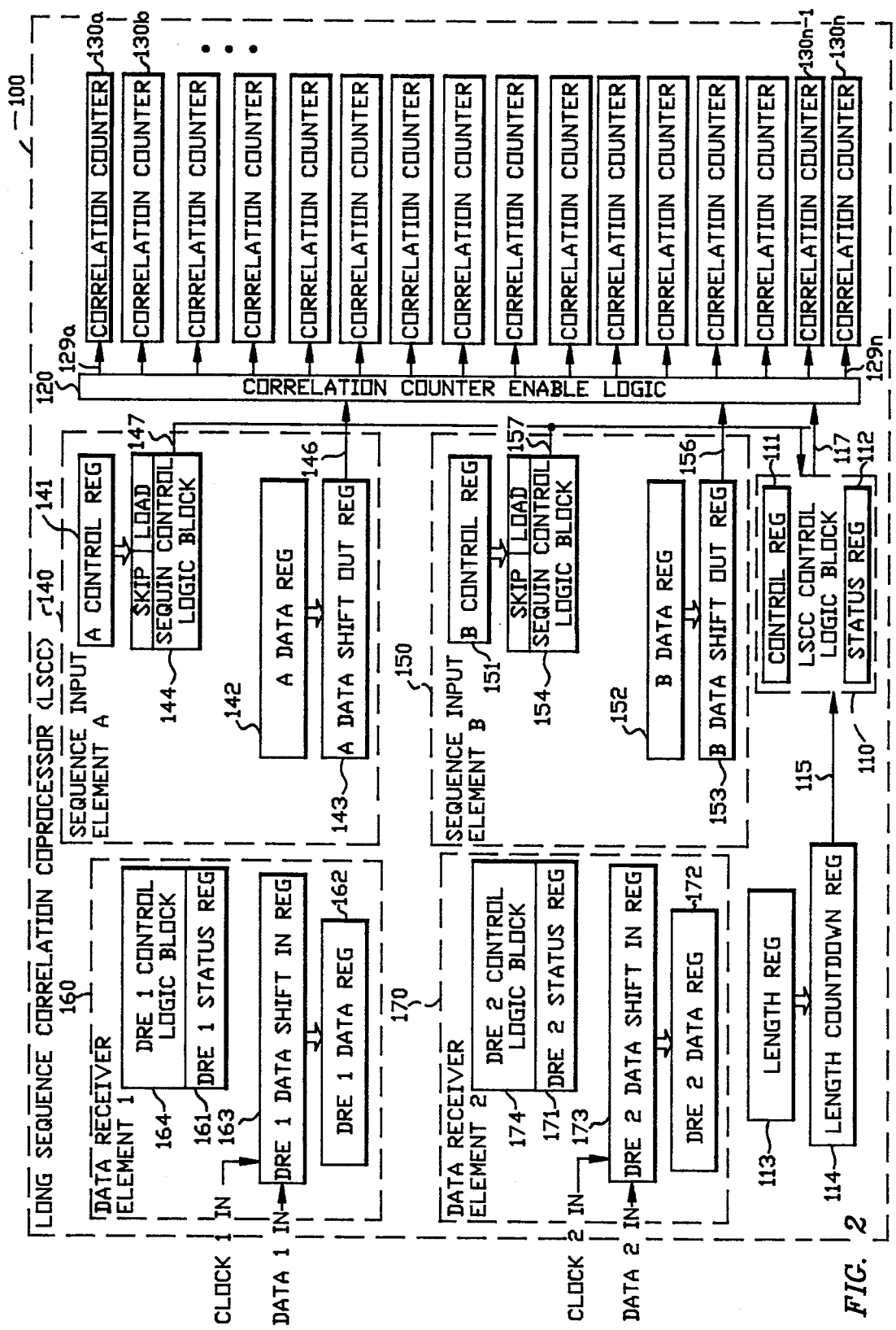
FIG. 2 shows a schematic block diagram depicting the interconnection of the internal components of the long sequence correlation coprocessor.
Figure 3:
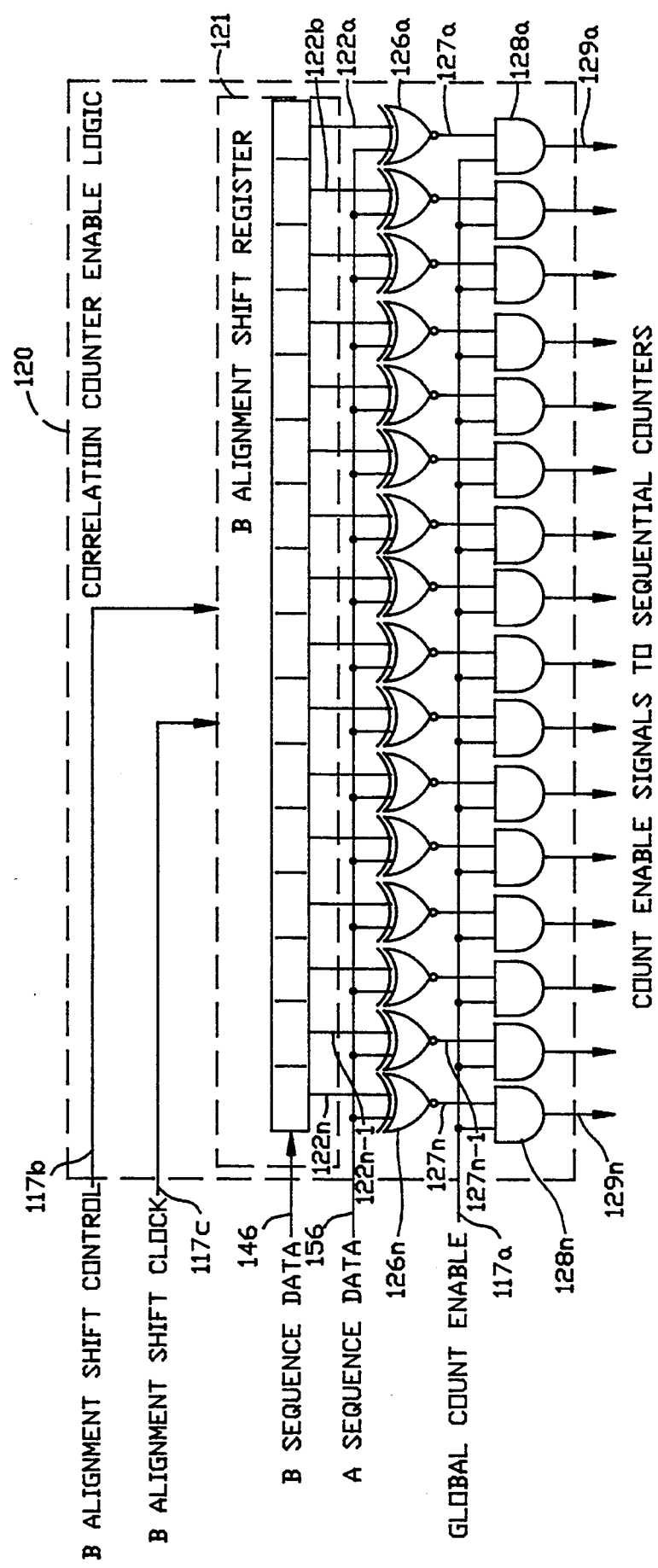
FIG. 3 shows a more detailed schematic block diagram of the correlation counter enable logic (which appears as a single block in FIG. 2), including its incorporated shift register.

Control logic blocks 144, 154 within the two sequence input elements 140, 150 indicate whether they are presenting valid data bits 146, 156 through control signals 147, 157 to the LSCC's control logic block 110 which, in turn, regulates the correlation calculation process through control signals 117a, 117b and 117c, shown as reference character 117 in FIG. 2, sent to the correlation counter enable logic 120. When both data bits 146 and 156 are valid, the global count enable signal 117a is asserted, and each of the count enable signals 129a–129n will be asserted if and only if its corresponding B data bit 122a–122n is the same as the A data bit 156. On the next LSCC clock pulse, each of the sequential counters 130a–130n whose count enable logic signal 129a–129n is asserted is incremented and the B alignment shift register is shifted right, so that bit 122b moves to 122a, and so on. The length countdown register 114 is also decremented. Once activated, the LSCC 100 calculates a set of correlation coefficients at a rate usually limited by the computer processor 300's ability to transfer data to the LSCC's sequence input elements 140 and 150, until the length countdown register 114 counts down to zero or the computer processor 300 writes a HALT command to the LSCC's control register 111.

The data sequence(s) to be correlated may be already resident in storage buffers 410 and 420 in the computer memory 400. If not, the LSCC supports real-time data acquisition through one or more components called data receiver elements (DREs) 160 and 170, which operate completely independently of the rest of the LSCC. Two is a default number of DREs, in order to simultaneously capture two incoming bit streams, while only one DRE is needed for an autocorrelation application, and an application with multiple data receiving sensors may require many more. A separate external clock 166, 167, associated with each external data stream 165, 175, is used to clock these data bits into the DRE's internal shift registers 163, 173. For acoustical applications, this might occur at the rate of one bit every 100 microseconds. When enough bits have arrived to fill up a complete computer word (typically 16 bits), the data moves to a data holding register 162, 172, the DRE 160, 170 signals computer processor 300 that a word is ready by setting bits in its status word 161, 171, and the computer processor reads the DRE data registers 162, 172 and stores the word in a computer memory storage buffer 410, 420 before the next complete word is received by the DRE. The DREs operate independently of each other and of the LSCC's correlation logic, each DRE operating in accordance with its separate clock 166, 176.

In an alternate embodiment of the LSCC 100, a direct memory access (DMA) controller can be incorporated into the LSCC 100 to control the feed of data words from the external storage buffers 410 and 420 to the sequence input elements 140 and 150 without requiring the continuing participation of the controlling computer processor 300, resulting in higher system performance.

It can be seen from the above description that the LSCC 100 is a specialized VLSI processor which has been designed to rapidly calculate the correlation coefficients of pairs of extremely long sequences of data. It does this by simultaneously calculating the correlation score for 16 adjacent bit alignments between the two sequences. Sequences of up to 32,767 bits long can be correlated in a single step (this limit can be increased by increasing the number of bits in the length register and the counters); longer sequences can be correlated in multiple steps with insignificant additional time overhead, and no additional hardware required.

With an address/data bus interface designed to look like that of a simple static RAM memory chip, LSCC 100 integrated circuit is interfaced to a computer processor's address bus and an 8-, 16-, or 32-bit data bus (computer memory bus 200) and this external general purpose computer processor 300 serves as the controller for the LSCC. This controller sets up initial values in LSCC 100, feeds A sequence input element 140 and B sequence input element 150 control words 148, 158 and data words 149, 159 when needed, and then reads the final sums from the counters 130a–130n when the LSCC's calculations have been completed. Programming the computer processor 300 to control the LSCC is straightforward and can be performed in accordance with well established procedures by a programmer of ordinary skill without any undue experimentation. The most complex aspects of the programming are related to managing sequence data storage buffers 410 and 420 in external computer memory 400, especially for sequences whose beginning and end do not align to the computer word boundaries, but a programming exercise concerning these tasks is routinely performed by one skilled in the art to which this invention pertains.

The LSCC 100 can be fabricated by any number of industry standard integrated circuit fabrication techniques. Design can be realized by using standard cell building blocks or custom design methods. Custom design allows higher speed performance and higher density of integration, and lower costs in mass production.

This invention is especially useful when correlation scores are needed for only a small percentage of the possible alignments of two data streams; for example determining a slowly changing doppler correction. The number of LSCC clock cycles required to calculate a single set of coefficients is equal to the length of the sequence, plus a little overhead to preload the LSCC's internal B alignment shift register 121.

The advantages conferred by this invention are correlation of arbitrarily long sequences of data, ability to be memory mapped to 8-, 16-, and 32-bit memory busses, such as are used in standard industry products, and ease of implementation. Furthermore, the LSCC architecture allows for enhancement through incorporation of a direct memory access controller.

Obviously, many modifications and variations of the present invention are possible in the light of the present teachings. It is therefore to be understood that within the scope of the appended claims the invention may be practiced otherwise than as specifically disclosed.

I claim:

1. An apparatus for the correlation of two sequences of binary data interfaced via a memory bus (200) to a computer processor (300) and a computer memory (400) comprising:
   a plurality of sequential counter means (130a–130n), operating simultaneously, for each tallying sequentially a separate correlation coefficient in response to a common clock signal and one of a plurality of discrete counter enable signals (129a–129n) and
   correlation counter enable logic means (120) connected to receive said two sequences of binary data and connected to said plurality of sequential counter means (130a–130n) for comparing one bit (156) of the first sequence with a plurality of bits (122a–122n) of the second sequence during each cycle of said common clock signal to produce said plurality of discrete counter enable signals (129a–129n) to increment each of the sequential counter means (130a–130n) when the bits of the two sequences which are compared are the same, and thus provide separate correlation coefficients simultaneously for different alignments of said two sequences of data.

2. An apparatus according to claim 1 in which said correlation counter enable logic means includes a shift register (121) to provide that the same bit (156) of one sequence of binary data is compared simultaneously to adjacent bits of the second sequence (122n–122n) of binary data so that the correlation coefficients calculated simultaneously by the different sequential counters of said plurality of sequential counter means (130a–130n) represent adjacent alignments of the two sequences of binary data.

3. An apparatus according to claim 2 further including:
   two sequence input elements (140) and (150) coupled to said correlation counter enable logic means (120), each provided with a control block (144) and (154), to present the data bits serially to said correlation counter enable logic means (120).

4. An apparatus according to claim 3 in which said computer memory (400) coupled to said memory bus (200) and said computer processor (300) holds said two sequences of binary data in storage buffers (410) and (420) until the computer processor transfers them, a computer word at a time, to said sequence input elements (140) and (150).

5. An apparatus according to claim 4 further including:
   a pair of data receiver elements (160), (170) coupled to said memory bus (200) to accept externally clocked serial data streams; divide them into computer words and make them available for said computer processor (300) to transfer to external storage buffers (410) and (420) in said computer memory (400).

6. An apparatus according to claim 5 further including:
   a control logic block (110) responsive to computer parameters (118) from said computer processor to initiate and terminate the correlation calculation process and to coordinate its progress with the flow of control and data.

* * * * *